Figure 1:
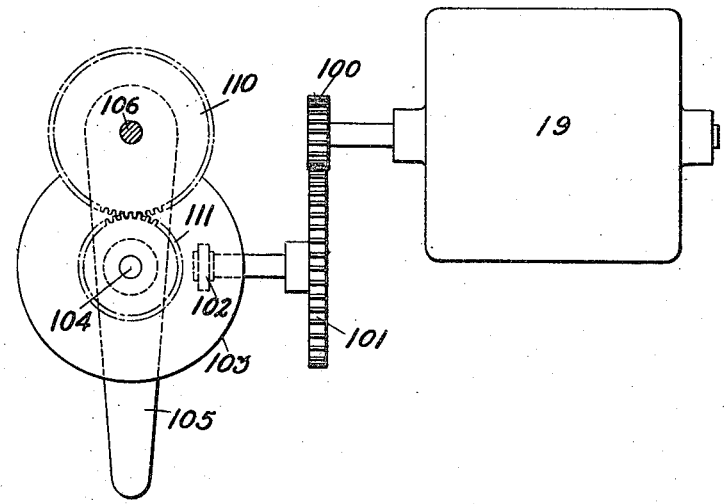

A. F. DIXON.
PRINTING TELEGRAPH SYSTEM.
APPLICATION FILED MAY 24, 1915.

1,286,959.

Patented Dec. 10, 1918.

Witnesses:
O. M. Guthe
John Waldheim

Inventor:
Amos F. Dixon.
by A. C. Funnel, Atty

UNITED STATES PATENT OFFICE.

AMOS FREDERICK DIXON, OF NEWARK, NEW JERSEY, ASSIGNOR, BY MESNE ASSIGNMENTS, TO WESTERN ELECTRIC COMPANY, INCORPORATED, A CORPORATION OF NEW YORK.

PRINTING-TELEGRAPH SYSTEM.

1,286,959.

Specification of Letters Patent.   Patented Dec. 10, 1918.

Application filed May 24, 1915.  Serial No. 30,005.

*To all whom it may concern:*

Be it known that I, AMOS FREDERICK DIXON, a citizen of the United States, residing at Newark, in the county of Essex and State of New Jersey, have invented certain new and useful Improvements in Printing-Telegraph Systems, of which the following is a full, clear, concise, and exact description.

This invention relates to telegraph systems and its principal object is to provide a simple system and apparatus for testing automatic transmitters and selecting mechanisms, such as those employed in printing telegraphs.

In the initial adjustment or repair of transmitting and receiving instruments such as used in printing telegraph systems, it is highly desirable to be able to accurately and readily test the performance of the various units. The different units should all be under the supervision of the person making the test and no extraneous sources of trouble, such for example as loss of synchronism between current distributers or line variations, should be allowed to complicate, prolong or disturb the making of accurate tests and adjustments. Thus, if a printer can be tested with a transmitter that is known to be accurate and the printer does not print or otherwise function properly, it is at once apparent that the trouble is in the printer. Likewise if a transmitter can be tested with a printer known to be accurate and false operations are produced, it is known at once that the transmitter is, in some manner, defective. Furthermore, if when a system is not responding properly to the line impulses the printer or transmitter may be tested with apparatus known to function properly and the particular instrument under test is found to be in good operating condition, then it is readily apparent that the trouble lies elsewhere, and is probably due to loss of synchronism or line variations. In this way the search for the source of defective operation will be materially simplified and it is a comparatively easy matter to locate the unit giving the trouble and then the particular element or elements of that unit can be thoroughly tested and adjusted. It is desirable that an instrument, whether transmitter or selecting mechanism, could be tested alone by providing ready means for applying operating current to its various elements either singly or in the various combinations experienced in actual operation.

To the above end the invention contemplates an improved variable speed current distributer adapted to be associated with the instruments to be tested, together with means for facilitating their association. Circuit connections are also provided whereby the units of the instruments may be independently tested without interference with or danger to the rest of the apparatus.

Figure 2:
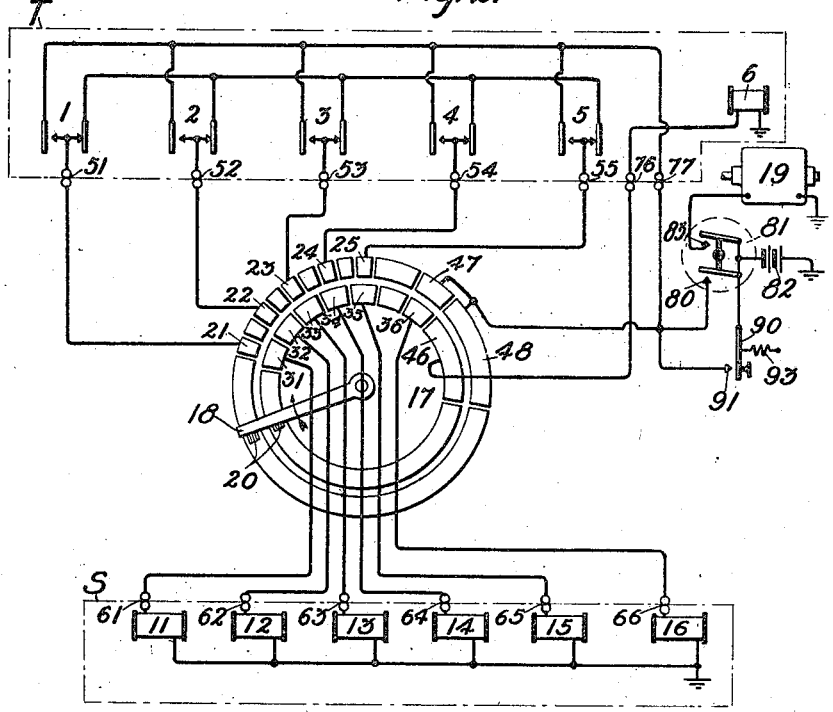

The above and other objects of this invention will be fully set forth in the following description and claims and will be more readily understood by reference to the accompanying drawing in which Figure 1 is a plan of the speed controlling mechanism and Fig. 2 shows the system of connections diagrammatically.

The apparatus to be tested is represented as an automatic transmitter T and a selecting apparatus S of a telegraph printer. The transmitter may be of the type disclosed in French Patent No. 361,261 and the printer may be of the type disclosed in U. S. Patent No. 1,103,133 patented July 14, 1914, although the testing set to be described may be used in trying out other forms of apparatus.

Transmitter T is provided with a plurality of tape controlled switches 1, 2, 3, 4 and 5, and an operating magnet 6, while the printer selecting apparatus S is represented by electromagnets 11, 12, 13, 14 and 15 and a release electromagnet 16. For a fuller description of these pieces of apparatus, reference may be had to the above noted patents.

The testing set comprises a current distributer 17 provided with a rotatable arm 18 which is adapted to be driven by a suitable motor 19. Arm 18 of distributer 17 is provided with a pair of contact brushes 20 which are adapted to sweep over and successively interconnect a group of transmitter segments 21, 22, 23, 24 and 25 and a group of receiver segments 31, 32, 33, 34 and 35. The distributer is also provided with a selector local segment 36, a transmitter local segment 46 and a pair of power segments 47 and 48. Segments 21 to 25 inclusive are connected respectively to suitable contact clips 51, 52, 53, 54 and 55, these clips being of any desired form for effecting an easy connection to the respective movable contacts of switches 1 to 5 inclusive of transmitter T. Receiving segments 31 to 35 inclusive are in a like manner joined to suitable contact clips 61, 62, 63, 64 and 65 adapted to provide circuit connections respectively to the selecting electromagnets 11 to 15 inclusive. Selector local segment 36 is connected to a contact clip 66 adapted to make connection to one terminal of electromagnet 16, and transmitter local segment 46 is connected to a contact clip 76 adapted to make connection to one terminal of the transmitter operating electromagnet 6. The normally unengaged or left-hand fixed contacts of switches 1 to 5 inclusive are connected together and to a contact clip 77, through which current is supplied to the transmitter, as will be hereinafter explained.

Clip 77 and power segments 47 and 48 are connected to a fixed contact 80 of a double pole single throw switch 81, both of whose blades are connected to a grounded source of energy 82. A second fixed contact 83 of switch 81 is connected to the motor 19. It is therefore readily apparent that when switch 81 is closed current is supplied from source 82 to the power segments 47 and 48, to the left-hand fixed contacts of switches 1 to 5 inclusive through clip 77 and, through contact 83, to motor 19. The motor rotor will thereupon start to revolve, causing brushes 20 to move in the direction of the arrow in Fig. 2. to successively interconnect segments 21 to 25 inclusive and 31 to 35 inclusive, and after all of these segments have been traversed, to interconnect power segment 47 and selector local segment 36, and power segment 48 and transmitter local segment 46. During this operation, through the agency of the switches 1 to 5 inclusive which have been previously selectively actuated by the perforated tape in the transmitter T, current will flow from grounded source 82, through contact 80 and clip 77, the selected switches 1 to 5 inclusive and corresponding segments 21 to 25 inclusive and 31 to 35 inclusive, through selecting electromagnets 11 to 15 inclusive. Wherever the condition of one of the switches 1 to 5 inclusive has not been altered, no current will flow through the corresponding electromagnets 11 to 15 inclusive. After all of the selecting operations have been performed, brushes 20 will interconnect segments 47 and 36, closing a circuit from source 82 through the release electromagnet 16, whereupon the printer will perform its function, as described in the above noted U. S. patent.

The next step in the operation of the test set is the interconnection of segments 46 and 48 by brushes 20, whereupon current will flow from source 82 through the transmitter operating electromagnet 6, causing the proper feeding of the tape, as described in the above noted French patent.

In order that each switch 1 to 5 inclusive of transmitter T and corresponding electromagnet 11 to 15 inclusive of selecting apparatus S, as well as the electro-magnets 6 and 16 may be individually tested means are provided whereby current from source 82 may be momentarily carried to the apparatus to be tested without causing the actuation of motor 19. In this way arm 18 may be slowly rotated by hand, so that brushes 20 will interconnect any of the desired segments as long as necessary, and repeated tests may be made upon each individual element of the transmitter and selector without causing the operation of any of the others. This is accomplished by means of the by-pass switch 90 whose fixed contact 91 is connected to clip 77 and power segments 47 and 48. Switch 90 is provided with suitable means for automatically causing it to be disengaged from contact 91, when the pressure is removed therefrom. Such means may be a spring 93. When switch 90 therefore is depressed, connection is made from source 82 to the left-hand contacts of switches 1 to 5 inclusive, and to the power segments 47 and 48, such circuit being maintained only while the pressure is being exerted upon the switch. Arm 18 may now be turned so that brushes 20 interconnect any desired pair of segments, and upon the depression of key 90 and the proper manipulation of the corresponding switches 1 to 5 inclusive, a circuit will be formed through the corresponding electromagnet 11 to 15 inclusive. In a like manner electromagnets 6 and 16 may be separately operated. By making switch 90 of the automatically opening type, there is no possibility of a circuit being kept inadvertently closed through any of the electromagnets 6 and 11 to 16 inclusive, which might result in their being injuriously overheated.

In order that brushes 20 may successively interconnect the segments of the distributer at different rates of speed, so that the apparatus to be tested may be operated under varying conditions, an adjustable speed transmission device is provided to interconnect motor 19 and arm 18. The shaft of motor 19 is provided with a suitable pinion 100 which is adapted to mesh with a gear wheel 101. The shaft of gear wheel 101 is provided with a friction wheel 102 which is adapted to coöperate with and impart motion to a friction disk 103. Disk 103 is carried upon a shaft 104 secured to a speed controlling lever 105. Lever 105 is pivoted upon a shaft 106 which is in line with the axis of arm 18. Preferably lever 105 is loosely mounted upon shaft 106 while arm 18 is secured thereto. Shaft 106 also carries a gear wheel 110 adapted to engage a pinion 111 carried by a shaft 104 and rotated by disk 103. When, therefore, the rotor of motor 19 rotates pinion 100, the motion is communicated by gear 101, friction wheel 102, disk 103, and gears 111 and 110 to arm 18. The rate of this motion may be varied by moving lever 105 about shaft 106, which results in the shifting of disk 103 so that the radius of the effective part thereof, relative to friction wheel 102, is varied. In Fig. 1, moving lever 105 to the right will decrease the speed of arm 18, while moving the lever to the left will increase the speed of arm 18, the rotation of the rotor remaining constant.

The invention claimed is:

1. A testing system comprising means for effecting circuit connections to the apparatus to be tested, a distributer associated therewith for providing current to and withdrawing current from such apparatus, a variable speed driver for said distributer, and circuit connections for providing current to said distributer and said motor and independently to said distributer.

2. A testing system comprising means for effecting circuit connections to the apparatus to be tested, a distributer associated therewith for providing current to and withdrawing current from such apparatus, a motor for driving said distributer, a switch and circuit connections for supplying current to said motor and said distributer, and a switch for supplying current to said distributer independently of said motor and said first mentioned switch.

3. In a testing system for signaling apparatus, the combination of a machine to be tested, a testing machine, a source of current for operating said machines, means in circuit with said machines and said source of current for supplying said current intermittently to said machines, and a motor for driving said current supplying means.

4. In a testing system for signaling apparatus, the combination of a machine to be tested, a testing machine, a source of current for operating said machines, means in circuit with said machines and said source of current for supplying said current intermittently to said machines, a motor for driving said current supplying means, and means for varying the speed of the current supplying means independently of the motor speed.

5. In a testing system for signaling apparatus, the combination of a machine to be tested, a testing machine, a source of operating current, means in circuit with said machines for supplying intermittent current to said machines, a motor for driving said current supplying means, means for simultaneously connecting said motor and current supplying means with the source of current, and means for connecting said current supplying means with the source of current independently of said motor.

6. In a testing system for signaling apparatus, the combination of a machine to be tested, a testing machine, a source of operating current, means in circuit with said machines for supplying current intermittently to said machines, a motor for driving said current supplying means, means for connecting said motor of said current supplying means simultaneously with a source of current, means for connecting said current supplying means with a source of current independently of said motor, and means for varying the speed of the current supplying means independently of the motor speed.

In witness whereof, I hereunto subscribe my name this 21 day of May A. D., 1915.

AMOS FREDERICK DIXON.